United States Patent [19]

Verma et al.

[11] Patent Number: 6,033,595

[45] Date of Patent: Mar. 7, 2000

[54] CORROSION INHIBITING SOLUTIONS AND PROCESSES FOR REFRIGERATION SYSTEMS COMPRISING HALIDES OF A GROUP VA METALLIC ELEMENT

[75] Inventors: Shyam Kumar Verma, Gastonia, N.C.; Manuel Sarkis Mekhjian, Fremont, Calif.; George Robert Sandor, Gastonia, N.C.; Philip John Boon, Lower Heswall, United Kingdom

[73] Assignee: FMC Corporation, Philadeplhia, Pa.

[21] Appl. No.: 08/896,110

[22] Filed: Jul. 17, 1997

Related U.S. Application Data

[60] Provisional application No. 60/022,217, Jul. 18, 1996.

[51] Int. Cl.[7] .............................. C09K 5/04; F25B 15/00
[52] U.S. Cl. .................................. 252/69; 252/67; 62/114
[58] Field of Search .................. 252/69, 67; 62/114, 62/112

[56] References Cited

U.S. PATENT DOCUMENTS

| | | | |
|---|---|---|---|
| 3,478,530 | 11/1969 | Aronson | 62/112 |
| 4,019,992 | 4/1977 | Krueger | 252/68 |
| 4,237,312 | 12/1980 | Stapp | 560/246 |
| 5,101,888 | 4/1992 | Sprouse et al. | 165/104.26 |

FOREIGN PATENT DOCUMENTS

| | | |
|---|---|---|
| 1-174588 | 7/1989 | Japan . |
| 7-138559 | 5/1995 | Japan . |
| 8-75292 | 3/1996 | Japan . |

OTHER PUBLICATIONS

Chemical Abstracts, 74:106645, "Synthesis and some physiochemical properties of complex halides of lithium and antimony", Zimina et al, no month available 1969.

Chemical Abstracts, 90:172469, "Protection of metals from corrosion in acid organic media", Basov et al., no month available 1979.

Japanese Patent Abstract 5228327, Sep. 1993.

K.Aramaki and H.Nishihara, Fac. Sci. Technol., Keio Univ., Yokohama, 223, Japan 10(7):207–11 (1992) no month available.

Japanese Patent Abstract 6221728, Aug. 1994.

Japanese Patent Abstract 2296888, Dec. 1990.

*Primary Examiner*—Christine Skane
*Attorney, Agent, or Firm*—Alston & Bird LLP

[57] ABSTRACT

Anticorrosion solutions useful for refrigeration processes are disclosed. Halides of Group Va metallic elements can be added to alkali metal halide absorption refrigeration solutions to minimize corrosion of the refrigeration system.

22 Claims, 1 Drawing Sheet

CORROSION INHIBITING SOLUTIONS AND PROCESSES FOR REFRIGERATION SYSTEMS COMPRISING HALIDES OF A GROUP VA METALLIC ELEMENT

CROSS REFERENCE TO RELATED APPLICATION

This application is related to commonly owned copending Provisional Application Ser. No. 60/022,217, filed Jul. 18, 1996.

FIELD OF THE INVENTION

This invention relates generally to solutions for refrigeration systems, and in particular to absorption solutions which include corrosion inhibiting agents.

BACKGROUND OF THE INVENTION

Absorption refrigeration machines are widely used in commercial operations. A typical absorption refrigeration machine includes four major sections: absorber, generator, condenser, and evaporator.

In the absorber section, an absorbent fluid, typically an aqueous alkali metal halide solution, such as a lithium bromide solution, absorbs a refrigerant, typically water vapor. The absorber can be operated under sub-atmospheric pressure. The resultant weak or diluted absorbent fluid (about 40–58% concentration of alkali metal halide rich in the refrigerant) is pumped to the generator. Here heat is applied to the fluid to partially boil off the refrigerant to again concentrate the absorbent fluid. The concentrated absorbent solution (now about 63–65% alkali metal halide) from the generator is passed through a heat exchanger and then sprayed back into the absorber section where it resumes absorption of the refrigerant vapor.

The refrigerant vapor liberated in the generator migrates to the condenser where it is liquefied by exchanging heat with a cooling fluid (typically water) flowing through tubing (typically copper based alloy tubes) present in the condenser section. The liquid refrigerant in the condenser moves into the evaporator, which is also operated at an extremely low pressure. In the evaporator, the refrigerant cools the relatively warm system water circulating through the tubes of the tube bundle, and the chilled water is circulated to the load. Heat from the system water vaporizes the refrigerant water which then migrates to the absorber section for absorption into the concentrated solution and completes the cycle.

Aqueous alkali metal halide solutions are widely used as absorption fluids in commercial absorption refrigeration systems. An exemplary alkali metal halide solution for this application is a lithium bromide solution, adjusted to pH range of 7–13 with lithium hydroxide. Although this and other types of absorption solutions can be advantageous for the refrigeration cycles, alkali metal halides can be corrosive towards the materials used to construct the refrigeration machine. Such materials can include mild and stainless steel for containment components and copper or copper-nickel alloys for tube bundles, among others.

In addition to the surface damage caused by corrosion, the corrosion reaction evolves hydrogen gas as a byproduct. Incondensibles in the form of atoms or ions can easily enter and diffuse into metals, resulting in the degradation of their mechanical properties under certain system conditions.

The severity of corrosion can vary, depending upon factors such as temperature of the system, concentration of alkali metal halide in the absorption solution, metals used in the construction of the refrigeration unit, the presence of air, and the like. For example, during use, the internal temperatures of such machines can be high, typically up to about 450° F. and higher, depending on the type of the absorption cycle, which can increase the corrosive effect of the alkali metal halide solution.

Various additives, such as lithium chromate, lithium nitrate, and lithium molybdate, have been proposed as corrosion inhibitors in alkali metal halide absorption solutions. However, lithium chromate can raise environmental concerns, and its use is being phased out. Further, the level of chromate and its oxidation state must be carefully maintained. If too little chromate is used, then it does not properly passivate the whole metal surface and pitting can result. Lithium nitrate can potentially evolve ammonia, which can cause stress corrosion cracking of copper based alloys such as heat exchanger tubes. Lithium molybdate exhibits only limited solubility in alkali metal halide solutions. In addition, lithium molybdate is metastable in aqueous halide solutions and thus it can be difficult to maintain a constant concentration of molybdate ions in solution.

Antimony oxides have also been proposed as corrosion inhibitors in alkali metal halide absorption solutions. See JP 7-138559 and JP 1-74588. However, these compounds also can have limited solubility in alkali metal halide solutions.

SUMMARY OF THE INVENTION

The present invention provides alkali metal halide solutions, preferably lithium halide solutions, and more preferably lithium bromide solutions, which are useful as absorption fluids in refrigeration machines. The absorption solutions of the invention contain halides of metallic elements of Group Va of the Periodic Table of Elements, preferably antimony bromide ($SbBr_3$), as a corrosion inhibition additive.

The amount of the metallic Group Va element, such as antimony as antimony bromide present in the solution, can vary, depending upon various factors. Preferred amounts range from about 50 ppm to about 5000 ppm, more preferably about 150 ppm to about 400 ppm.

The resultant solutions can provide comparable and even improved corrosion inhibition as compared to solutions which include conventional corrosion inhibition additives. For example, the solutions of the invention can provide good anticorrosion benefits for carbon steel at high temperatures.

Still further, antimony bromide can exhibit improved solubility in alkali metal halide solutions, such as lithium bromide solutions, as compared to lithium molybdate and antimony oxide, and accordingly the concentration of desired anticorrosion ions in solution can be increased.

Other advantages include reduced corrosion of the refrigeration machine, such as carbon steel, due to vapor phase, reduced amount of hydrogen generation and enhanced performance of the chillers, due to reduced accumulation of non-condensable gas in the absorber.

Still further, use of the absorption solutions on a refrigeration machine can result in a protective layer containing antimony and magnetite (iron oxide) formed on carbon steel. The inventors have found that protective layer which forms as a result of using the solutions of the invention can be more corrosion resistant than oxide layers formed in the presence of conventional corrosion inhibitors, such as lithium molybdate, in which magnetite films tend to be more amorphous and less developed.

BRIEF DESCRIPTION OF THE DRAWING

Some of the features and advantages of the invention having been described, others will become apparent from the detailed description which follows, and from the accompanying drawing, in which.

DETAILED DESCRIPTION OF THE INVENTION

Figure 1:
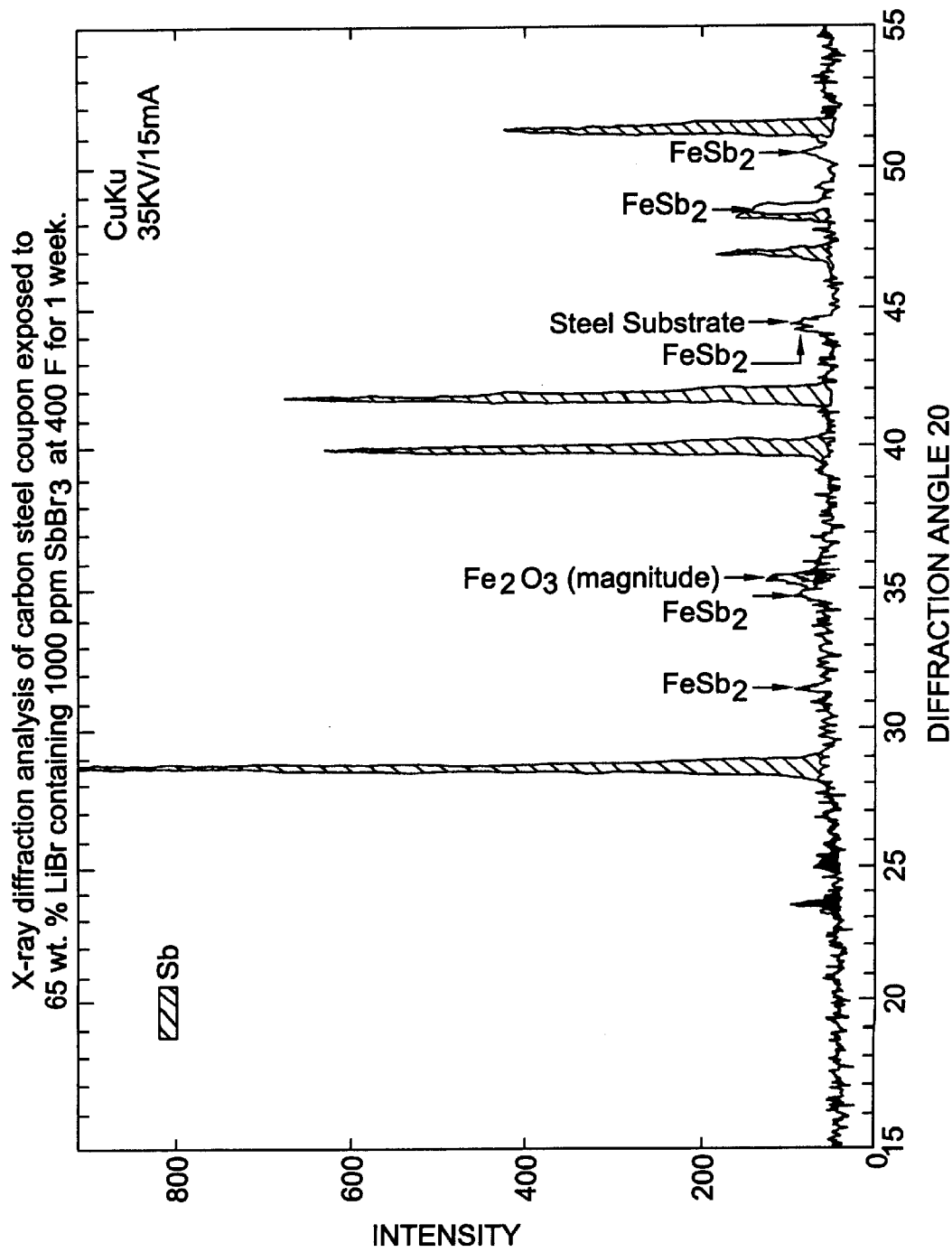
FIG. 1 is an x-ray diffraction pattern of a surface layer formed on carbon steel coupons exposed to an antimony bromide (1000 ppm)/LiBr (65 wt. %) solution at 400° F. for one week.

The compositions of the invention include as a corrosion inhibiting component at least one halide of the Group Va metallic elements (i.e., arsenic, antimony, and bismuth). The halide can be, for example, bromide, chloride, or iodide and preferably is bromide. Exemplary halides of Group Va metallic elements useful as corrosion inhibiting agents in the absorption solutions of the invention include antimony bromide ($SbBr_3$), arsenic bromide, and bismuth bromide, and the like and mixtures thereof. These Group Va metallic elements as ions in solution can exhibit corrosion inhibiting properties in absorption refrigeration systems. The halides of Group Va metallic elements useful in the solutions of the invention also are preferably substantially completely soluble in alkali metal halide solutions, such as lithium bromide solutions, so as to maximize the concentration of the corrosion inhibiting ions in solution.

The halides of Group Va metallic elements can be used singly or as mixtures with one another and/or with other corrosion inhibiting agents. The halides of Group Va metallic elements are present in the absorption solutions in amounts sufficient to provide the desired corrosion inhibiting effect. This amount can vary depending upon various factors, such as the solubility of the halides of Group Va metallic elements in the absorption solution, the nature of the ions of the halides of Group Va metallic elements, temperatures of the environment of the refrigeration machine, concentration of the alkali metal halide solution, metals used in the construction of the refrigeration unit, the presence of air, and the like. Preferably, the absorption solutions of the invention include metallic elements of Group Va as halide in an amount ranging from about 50 parts per million (ppm) to about 5000 ppm, and more preferably from about 150 ppm to about 400 ppm.

The absorption solutions include alkali metal halide in conventional amounts. An exemplary alkali metal halide solution includes alkali metal halide in an amount from about 40 to about 65 weight percent, preferably about 50 to about 65 weight percent, based on the total weight of the solution. The alkali metal halide can be, for example, lithium halide, preferably lithium bromide, although the absorption solution can include other alkali metal halides, such as lithium chloride, lithium iodide, as well as mixtures of these. Still further, the absorption solution can include lithium nitrate. Still further, the absorption solution can include other halides, such as zinc halides, which are particularly useful in high temperature applications (generally about 450° F. and higher). The zinc halides can be present in amounts up to about 45 weight percent (for example, a solution comprising 45 wt. % zinc halide and 20 wt. % lithium bromide).

As the skilled artisan will appreciate, the environment or conditions, such as temperature and/or pressure, of different refrigeration machines can vary. Typically, the temperature of the machine ranges from about 150° F. to about 500° F., although the temperature can be outside this range as well. The solutions of the invention are particularly advantageous in higher temperature applications.

The solutions of the invention can include mixtures of halides of Group Va metallic elements with one another and/or with other corrosion inhibitors as known in the art in conventional amounts.

The present invention will be further illustrated by the following non-limiting examples.

EXAMPLE 1

Tests were performed in a pressure vessel autoclave with temperature control (±2° F.). A concentrated (65 wt. %) lithium bromide solution was prepared using anhydrous lithium bromide and deionized water. The alkalinity of each solution was adjusted with lithium hydroxide to control the solution pH at a level that optimized the performance of each chemical or generally accepted in the industry.

Sample solutions were prepared by adding antimony bromide or antimony oxide or lithium molybdate to the lithium bromide solution. Each of the above inhibitors was added individually to 800 ml lithium bromide solution. Pre-weighed metal coupons were placed in, and above the lithium bromide solution contained in a 2 liter cylinder made of Inconel-600 material which fits into the autoclave. The cylinder containing the absorption solution and metal coupons was evacuated (to about 29.6 in of Hg) using a vacuum pump prior to starting the test. The solution was heated to a specified temperature and held at that temperature for a period of 72 hours.

Upon completion, the test coupons were removed and cleaned. The corrosion rate was calculated from the weight loss. The coupons were also tested by surface analysis. The results are set forth in Table 1 below. $SbBr_3$ exhibits better corrosion protection than that offered by antimony oxide.

TABLE 1

| Additive | Concentration (ppm) | Corrosion Rate (mils per year) for Carbon Steel at | | | |
| --- | --- | --- | --- | --- | --- |
| | | 300° F. | 350° F. | 400° F. | 450° F. |
| None | | 31 | 41 | 200 | 326 |
| Antimony bromide ($SbBr_3$) | 500 | 8 | 3.3 | 7.0 | 34 |
| pH 11–12 | 1000 | — | — | — | 18 |
| Antimony oxide ($Sb_2O_3$) | 500 | 28 | 24 | 40 | 57 |
| Lithium Molybdate | 199 | 28 | 64 | 38 | 43 |

EXAMPLE 2

Tests were performed as described above in Example 1, except that corrosion rates were evaluated for carbon steel coupons in antimony bromide (1000 ppm) in a 65 wt. % LiBr solution at 400° F. for a period of 168 hours. The corrosion rate was 8.5 mils per year. Hydrogen generation was also determined to be 2.4 mg/in² of carbon steel. The corrosion rate and $H_2$ evolution in the presence of $SbBr_3$ is much lower than that observed in the presence of 199 ppm of $Li_2MoO_4$ (a conventional corrosion inhibitor) at similar conditions (corrosion rate=12 mpy, $H_2$=6.8 mg/in² of carbon steel).

The surface of carbon steel coupon treated in the formulation containing antimony bromide was analyzed using X-ray diffraction method. The X-ray diffraction measurements were carried out on a wide angle diffractometer using CuKα radiation with a diffracted beam monochromator. The carbon steel metal coupon was exposed to antimony bromide (1000 ppm)/LiBr solution (65 wt. %) at 400° F. for one week. FIG. 1 presents the X-ray diffraction pattern to a specific area of the metal coupon where the protective coating was formed after an attack from the brine solution. The peaks seen in the spectra identify elemental antimony as the major phase in the coating with some magnetite ($Fe_2O_3$) and $FeSb_2$.

The foregoing examples are illustrative of the present invention and are not to be construed as limiting thereof.

That which is claimed is:

1. An absorption solution for refrigeration systems, consisting essentially of at least one alkali metal halide in an amount of at least about 20 percent by weight based on the total weight of the solution, at least one bromide of a Group Va metallic element in an amount sufficient to provide a corrosion inhibiting effect, optionally zinc halide, and optionally lithium nitrate.

2. The solution of claim 1, wherein said at least one bromide of a Group Va metallic element comprises antimony bromide ($SbBr_3$).

3. The solution of claim 1, wherein said at least one Group Va metallic element is present as bromide in an amount of about 150 ppm to about 400 ppm.

4. The solution of claim 1, wherein said at least one alkali metal halide is selected from the group consisting of lithium bromide, lithium chloride, lithium iodide and mixtures thereof.

5. The solution of claim 1, wherein said alkali metal halide is present in an amount of about 40 to about 65 percent by weight based on the total weight of the solution.

6. The solution of claim 1, wherein said at least one bromide of a Group Va metallic element is selected from the group consisting of antimony bromide, arsenic bromide, bismuth bromide, and mixtures thereof.

7. The solution of claim 1, wherein said bromide is present in an amount from about 500 ppm to about 5000 ppm.

8. The solution of claim 1, wherein said bromide is present in an amount from about 1000 ppm to about 5000 ppm.

9. An absorption solution for refrigeration systems, consisting essentially of at least one lithium halide in an amount of at least about 20 percent by weight based on the total weight of the solution and antimony bromide ($SbBr_3$).

10. The solution of claim 9, wherein said alkali metal halide is present in an amount of about 40 to about 65 percent by weight based on the total weight of the solutions.

11. The solution of claim 9, wherein said bromide is present in an amount from about 500 ppm to about 5000 ppm.

12. The solution of claim 9, wherein said bromide is present in an amount from about 1000 ppm to about 5000 ppm.

13. A process for inhibiting the corrosion of a refrigeration machine resulting from the presence of alkali metal halide absorbent solutions, comprising circulating in a refrigeration machine an absorption solution consisting essentially of at least one alkali metal halide in an amount of at least about 20 percent by weight based on the total weight of the solution, at least one bromide of a Group Va metallic element in an amount sufficient to provide a corrosion inhibiting effect, optionally zinc halide and optionally lithium nitrate.

14. The process of claim 13, wherein said at least one bromide of a Group Va metallic element is antimony bromide ($SbBr_3$).

15. The process of claim 13, wherein said at least one Group Va metallic element is present as bromide in an amount of about 150 ppm to about 400 ppm.

16. The process of claim 13, wherein said at least one alkali metal halide is selected from the group consisting of lithium bromide, lithium chloride, lithium iodide and mixtures thereof.

17. The process of claim 13 wherein during said circulating step, said at least one bromide of a Group Va metallic element forms a protective layer on a surface within said machine.

18. The process of claim 13, wherein during said circulating step said solution is exposed to temperatures ranging from about 150° F. to about 550° F.

19. The process of claim 13, wherein said alkali metal halide is present in an amount of about 40 to about 65 percent by weight based on the total weight of the solution.

20. The process of claim 13, wherein said at least one bromide of a Group Va metallic element is selected from the group consisting of antimony bromide, arsenic bromide, bismuth bromide and mixtures thereof.

21. The process of claim 13, wherein said bromide is present in an amount from about 500 ppm to about 5000 ppm.

22. The process of claim 13, wherein said bromide is present in an amount from about 1000 ppm to about 5000 ppm.

* * * * *